US012705541B2

(12) United States Patent
Janjos et al.

(10) Patent No.: US 12,705,541 B2
(45) Date of Patent: Aug. 11, 2026

(54) DEVICE AND METHOD FOR TRAINING A VARIATIONAL AUTOENCODER

(71) Applicant: Robert Bosch GmbH, Stuttgart (DE)

(72) Inventors: Faris Janjos, Stuttgart (DE); Lars Rosenbaum, Lahntal (DE); Maxim Dolgov, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 517 days.

(21) Appl. No.: 18/465,627

(22) Filed: Sep. 12, 2023

(65) Prior Publication Data

US 2024/0095595 A1 Mar. 21, 2024

(30) Foreign Application Priority Data

Sep. 21, 2022 (EP) .................................... 22196963

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 9,367,819 B2 * 6/2016 Nicholson ................ G06N 7/01
11,062,229 B1 * 7/2021 Mnih ...................... G06F 17/18
11,430,123 B2 * 8/2022 Kohl .................... A61B 5/0033
11,568,207 B2 * 1/2023 van den Oord ........ G06N 3/044
11,948,083 B2 * 4/2024 Dalli .................... G06N 3/0455
2021/0103829 A1 * 4/2021 Barshan ................... G06N 3/09
2022/0101128 A1 * 3/2022 Fischer .................. G06N 3/088
2023/0072747 A1 * 3/2023 Pototzky ................ G06N 3/084

(Continued)

OTHER PUBLICATIONS

Shim et al., "Unsupervised Anomaly Detection for Electric Drives Based on Variational Auto-Encoder," 2022 IEEE Applied Power Electronics Conference and Exposition (APEC), 2022, pp. 1703-1708.

(Continued)

*Primary Examiner* — Maikhanh Nguyen
(74) *Attorney, Agent, or Firm* — NORTON ROSE FULBRIGHT US LLP

(57) ABSTRACT

A computer-implemented method for training a machine learning system. The training includes: determining, by an encoder of the machine learning system and based on a training input signal, a first intermediate representation characterizing a mean of a latent distribution of a latent space and a second intermediate representation characterizing a variance and/or covariance of the latent distribution; determining, based on the first intermediate representation and the second intermediate representation, a plurality of sigma points with respect to the latent distribution; determining an output signal, wherein the output signal is determined by providing a randomly sampled sigma point of the plurality of sigma points to a decoder of the machine learning system; adapting the machine learning system based on a loss value, wherein the loss value characterizes a difference between the training input signal and the output signal.

10 Claims, 6 Drawing Sheets

(56) References Cited

U.S. PATENT DOCUMENTS

2023/0351262 A1* 11/2023 Straehle .................. G06N 3/09

OTHER PUBLICATIONS

Slavic et al., "Anomaly Detection in Video Data Based on Probabilistic Latent Space Models," IEEE EAIS 2020—IEEE Conference on Evolving and Adaptive Intelligent, 2020, pp. 1-8.

Kingma et al., "Auto-Encoding Variational Bayes," Cornell University Library, 2014, pp. 1-14.

Menegaz et al. "A Systematization of the Unscented Kalman Filter Theory" IEEE Transactions on Automatic Control, vol. 60, No. 10, 2015, pp. 1-16. <https://bird.bcamath.org/bitstream/handle/20.500.11824/251/SystematizationUKFTheory.pdf;jsessionid=00D0A5F4738ACBC8ADC70A9395473F82?sequence=1> Downloaded Sep. 12, 2023.

* cited by examiner

DEVICE AND METHOD FOR TRAINING A VARIATIONAL AUTOENCODER

CROSS REFERENCE

The present application claims the benefit under 35 U.S.C. § 119 of European Patent Application No. EP 22 19 6963.7 filed on Sep. 21, 2022, which is expressly incorporated herein by reference in its entirety.

FIELD

The present invention concerns a computer-implemented method for training a machine learning system, a computer-implemented method for anomaly detection, a computer-implemented method for sampling trajectories of traffic participants

BACKGROUND INFORMATION

Menegaz et al. "A systematization of the unscented kalman filter theory" in IEEE Transactions on automatic control, 60(10), 2583-2598, 2015 describes different forms of sigma points.

Kingma and Welling "Auto-encoding variational bayes", arXiv preprint arXiv:1312.6114, 2013 describes a variational autoencoder.

Variational autoencoders (VAE) are used as backbones in solving a plurality of technical problems. For example, a VAE may be used for detecting anomalies in sensor measurements. It is also possible to use VAEs for sampling new sensor measurements based on an existing set of sensor measurements. The sampled sensor measurements may then in turn be used to train a machine learning system for classification and/or regression analysis based on the sensor measurements.

Training a VAE requires computing gradients with respect to an encoder of the VAE and a decoder of the VAE. While computing these gradients is relatively straightforward for parameters of the encoder, it requires a high-variance policy gradient for the posterior parameters. To avoid this issue in practice, the reparameterization trick is used to simplify the approximate posterior sampling by means of an easy-to-sample distribution. For example, with a Gaussian posterior, one can sample a multivariate normal and obtain a latent representation, which can then be forwarded to a decoder of the machine learning system.

However, taking a single or few random samples in the VAE setting can produce instances very far from the mean, especially in high dimensional spaces. In contrast to this common approach of training a VAE, the present invention provides using so called sigma points, i.e., predefined points in relation to the distribution predicted from the encoder. Using these sigma points, the authors found that the reconstruction ability of a VAE is improved. In other words, the VAE is able to better model a distribution of latent variables for the data used for training. In turn, this leads to an improvement for the different tasks the VAE may be used for.

SUMMARY

In a first aspect, the present invention concerns a computer-implemented method for training a machine learning system, wherein the machine learning system is configured for anomaly detection and/or sampling a trajectory for a traffic participant and/or sampling of sensor signals and/or for determining a value characterizing a likelihood of an input signal with respect to a training dataset. According to an example embodiment of the present inventio, the training comprises:

- Determining, by an encoder of the machine learning system and based on a training input signal, a first intermediate representation characterizing a mean of a latent distribution of a latent space and a second intermediate representation characterizing a variance and/or covariance of the latent distribution;
- Determining, based on the first intermediate representation and the second intermediate representation, a plurality of sigma points with respect to the latent distribution;
- Determining an output signal, wherein the output signal is determined by providing a randomly sampled sigma point of the plurality of sigma points to a decoder of the machine learning system;
- Adapting the machine learning system based on a loss value, wherein the loss value characterizes a difference between the training input signal and the output signal.

The machine learning system may be understood to characterize an autoencoder, especially a variational autoencoder. Typically, an autoencoder comprises an encoder part that maps input signals, e.g., sensor signals, of the autoencoder to a latent space. The decoder in turn is able to map from the latent space back to the space of the input signal. This way, an autoencoder is able to model a distribution of latent factors in the input signal in the latent space. In a variational autoencoder, the distribution is conditioned on a prior distribution, typically a standard multivariate normal distribution.

The machine learning system may be used for a variety of different applications. For example, it can be used for anomaly detection. This may be achieved by mapping an input signal to a latent representation (typically a latent vector) of the latent space with the encoder and mapping the determined latent representation back to the space of the input signal with the decoder. A difference between the input signal and the mapped back representation may then be used as a measure for how anomalous the input signal is. For example, the difference may be compared to a predefined threshold and the input signal may be considered as anomalous if the difference exceeds the threshold.

Alternatively, the decoder may be used for sampling input signals. This may be achieved by first training the machine learning system with input signals from some physical domain (e.g., signals obtained from a sensor or trajectories of objects in the physical word). Afterwards, a latent representation may be sampled at random and forwarded through the decoder of the machine learning system. The output signal of the decoder then characterizes an input signal as would appear in the physical domain.

Alternatively, the machine learning system may also be used to determine a value characterizing a likelihood of an input signal supplied to the machine learning system. That is, the machine learning system may determine how likely it is to observe an input signal based on having seen a plurality of input signals during training. The density value may, for example, be obtained by determining a first intermediate representation for the input signal by means of the encoder and determining a density value of the mean characterized by the first intermediate representation with respect to a standard multivariate normal distribution. The value characterizing a likelihood may also be used for anomaly detection, e.g., by determining the input signal as anomalous if the value characterizing the likelihood falls below a predefined threshold and determining the input signal to be normal otherwise.

It is also possible to configure the machine learning system for multiple of the described tasks. For example, the machine learning system may be able to determine a likelihood value for a given input signal while also being able to sample input signals based on the latent space.

According to an example embodiment of the present invention, for training the machine learning system, the encoder of the machine learning system first predicts the first intermediate representation and the second intermediate representation for the training input signal. The encoder may be understood as a sub-machine learning system of the machine learning system. Preferably, the encoder is a neural network, which accepts the training input signal as input a provides the first intermediate representation and the second intermediate representation as output. The first intermediate representation and second intermediate representation may be understood as characterizing a man and a variance and/or covariance of a distribution of latent factors for the training input signal.

Different from other methods for training an encoder-decoder machine learning system (e.g., autoencoders, in particular variational autoencoders), the method according to the present invention does not apply the reparameterization trick by randomly sampling the latent distribution characterized by the mean and the variance and/or covariance. Instead, a plurality of sigma points is advantageously determined in the method. A plurality of sigma points may be understood as a plurality of points in the latent space that have a fixed relative position with respect to the latent distribution.

Having determined the sigma points, a sigma point is then sampled at random from the plurality of sigma points and provided to the decoder of the machine learning system. The decoder may, again, be understood as a sub-machine learning system of the machine learning system and may also preferably be in the form of a neural network. An output signal of the decoder may be understood as an input signal from the space of the training input signal. The output signal determined for the randomly sampled sigma point may then be understood as an attempt of a reconstruction of the training input signal based on the sigma point.

The machine learning system, in particular parameters of the machine learning system, are then adapted based on a different between the training input signal and the output signal, i.e., the reconstruction of the input signal. This is preferably achieved by means of determining a loss value characterizing the difference and adapting at least one parameter of the machine learning system based on gradient descent, wherein a gradient of the loss value with respect to the at least one parameter is determined by means of backpropagation.

Advantageously, the author found that by using the sigma points, a variance of the gradient with respect to the loss value is reduced. This leads to a smoother optimization problem and in turn a better modelling of the latent factors of the training input signal by the machine learning system. Empirically, the authors could verify that, for example, output signals (i.e., reconstructions of an input signal) are closer to a corresponding input signal than in other methods. This advantageously leads to a better capability of anomaly detection as well as sampling input signals based on the decoder.

In preferred embodiments of the present invention, the sigma points in the plurality of sigma points are mean-centered symmetric points, preferably comprising the mean characterized by the first intermediate representation.

The authors found that advantageously, the mean-centered symmetric points are best suited as sigma points in reducing a variance in the gradient.

Preferably, the mean-centered symmetric points are determined according to the formulae:

$$\chi_0=\mu,$$

$$\chi_i=\mu+\sqrt{(\kappa+n)\Sigma},$$

$$\chi_{i+n}=\mu-\sqrt{(\kappa+n)\Sigma},$$

wherein $\kappa>-n$ is a predefined real constant, n is a dimensionality of the latent space, $\mu$ is the mean and $\Sigma$ is the variance and/or covariance.

In preferred embodiments of the present invention, the second intermediate representation may further characterize a full covariant matrix of the latent distribution. The term $\Sigma$ may hence be understood as a covariance matrix predicted from the encoder.

For reasons of simplicity, encoders of variational autoencoders are configured to only predict the variances of the latent distribution (i.e., the main diagonal of the covariance matrix). The authors found, that when configuring the encoder to predict a full covariance matrix, the best performing embodiments of the machine learning system all advantageously predict non-diagonal covariance matrices. In turn, the configuration for predicting full covariance matrices enables the machine learning system to model a better latent distribution, leading to a machine learning system that performs even better in anomaly detection or when sampling from the machine learning system using a random sample from the latent space and the decoder.

In preferred embodiments of the present invention, the loss value is determined based on a loss function, wherein the loss function is characterized by the formulae:

$$\mathcal{L}_{UAE}=E_{x_i\sim p_{data}}[\mathcal{L}_{REC}+\beta\cdot\mathcal{L}_{KL}],$$

$$\mathcal{L}_{REC}=\|x_i-D(z)\|_2^2,\ z\sim\left\{\chi_i\left(\mu,\sum\right)\right\}_{i=0}^{2n},$$

$$\mathcal{L}_{KL}=\|\mu\|_2^2+tr\left(\sum\right)-n-\text{logdet}\sum,$$

wherein $x_i$ is the training input signal, $p_{data}$ is an empirical distribution, e.g., a training dataset, D(•) characterizes an output of the decoder of the machine learning system (60) for an input z, z is a randomly sampled sigma point of the plurality of sigma points $$\left\{\chi_i\left(\mu,\sum\right)\right\}_{i=0}^{2n},$$

and $\beta$ is a hyperparameter of the training method.

This definition of the loss function may be understood as analogous to a loss function used for variational autoencoders, however, the proposed loss function accounts for the use of the sigma points in the proposed machine learning system. The term $\mathcal{L}_{KL}$ may be understood as a Kullback-Leibler divergence of the distribution characterized by the mean and variance and/or covariance to a prior distribution chosen at the preference of the user of the machine learning system. In the preferred embodiments, the prior distribution is a standard multivariate normal distribution but other distributions are possible as well.

For simplicity, the Kullback-Leibler divergence may also be approximated by means of a Frobenius norm of a mismatch of Σ to an identity matrix, i.e., according to the formula:

$$\mathcal{L}_{KL} \approx \|\mu\|_2^2 + \left\|\sum - I\right\|_F,$$

wherein I is an identity matrix of the same shape as Σ. Advantageously, the approximation alleviates numerical instabilities during training of the machine learning system and thus prevents failure or divergence during training.

According to an example embodiment of the present invention, preferably, the loss function may further comprise a regularization term penalizing an input-output gradient, weighted by the largest eigenvalue of the covariance matrix. The regularization term may be characterized by the formula:

$$\mathcal{L}_{REG} = \lambda_{\max}\left(\sum\right)\|\nabla_z D(z)\|_2^2,$$

wherein $\lambda_{max}$ is a largest eigenvalue of Σ and $\nabla_z D(z)$ is a gradient of the loss function with respect to z.

Advantageously, the regularization enables an even better modelling of the latent distribution and hence an increased performance in the different tasks the machine learning system may be used for.

In general, the training input signal may be obtained based on a sensor. That is, according to an example embodiment of the present invention, the machine learning system may especially configured for processing sensor signals. The input signal may be obtained from a plurality of different sensors, e.g., a camera, a LIDAR sensor, a radar, an ultrasonic sensor, a thermal camera, a piezo sensor, a Hall sensor, a microphone, a thermometer, or an acceleration sensor. The different sensor signals may especially be assessed by the machine learning system with respect to if they characterize anomalous signals.

Example embodiments of the present invention will be discussed with reference to the following figures in more detail.

DETAILED DESCRIPTION OF EXAMPLE EMBODIMENTS

Figure 1:
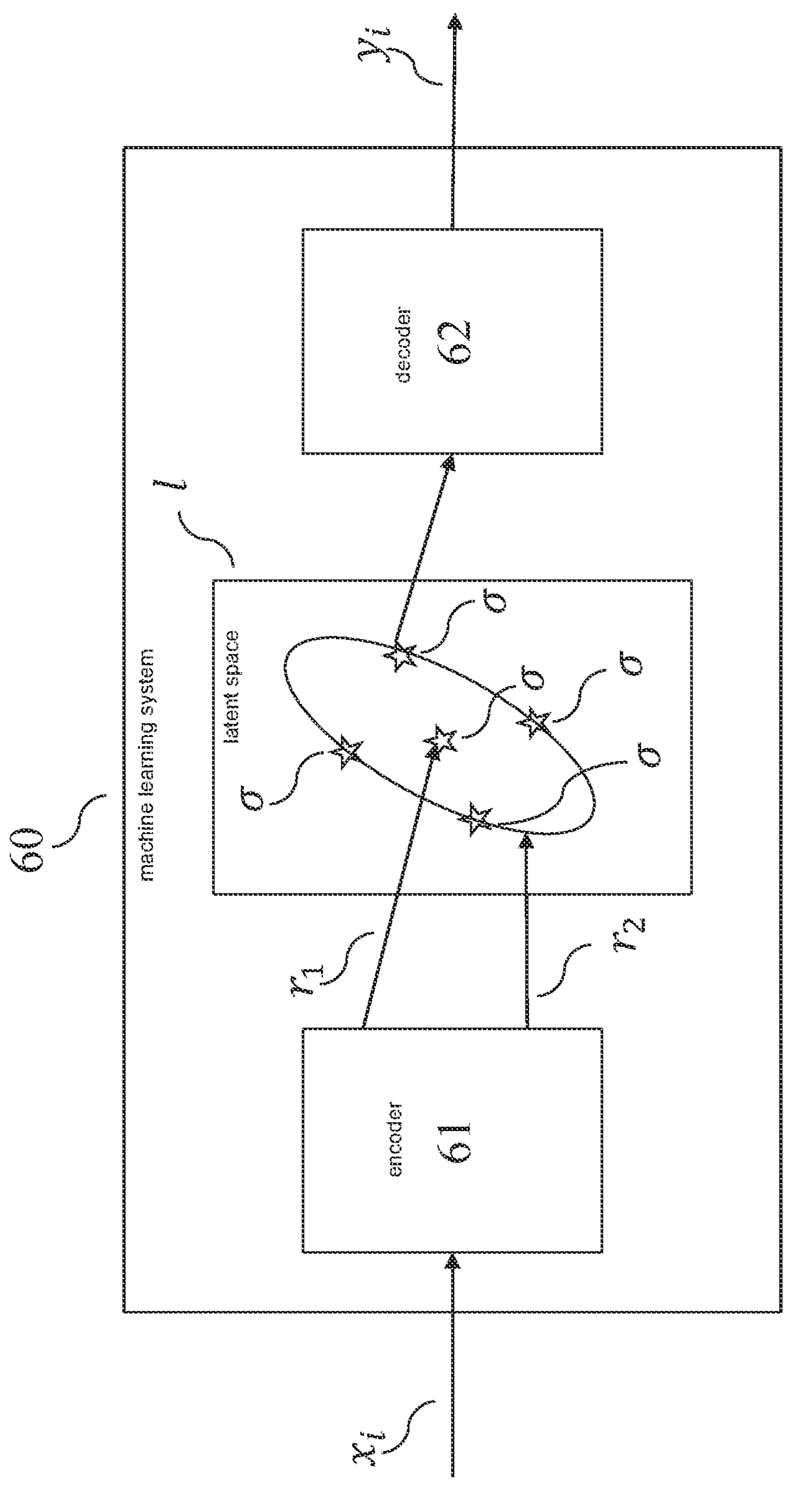
FIG. 1 shows schematically a machine learning system during training, according to an example embodiment of the present invention.

FIG. 1 shows an embodiment of a machine learning system (60) during training of the machine learning system (60). The machine learning system comprises an encoder (61), which is configured for accepting input signals and mapping the input signals to a first intermediate ($r_1$) representation characterizing a mean and a second intermediate representation ($r_2$) characterizing a covariance matrix. In other embodiments, the second intermediate representation ($r_2$) may also only characterize variances, i.e., a main diagonal of a covariance matrix. However, a full covariance matrix is preferred. The mean and the covariance matrix characterize a distribution, e.g., a normal distribution, in a latent space (l).

The encoder (61) is provided an input signal ($x_i$), for which the encoder (61) determines a first intermediate representation ($r_1$) and a second intermediate representation ($r_2$).

Based on the mean and the covariance matrix, a plurality of sigma points (σ) is determined. Preferably, the sigma points are determined according to the formulae:

$$\chi_0 = \mu,$$

$$\chi_i = \mu + \sqrt{(\kappa + n)\Sigma},$$

$$\chi_{i+n} = \mu - \sqrt{(\kappa + n)\Sigma},$$

wherein κ>−n is a predefined real constant, n is a dimensionality of the latent space, μ is the mean and Σ is the covariance matrix.

In the embodiment, a single sigma point (σ) is then sampled at random from the plurality of sigma points (σ) and provided as input to an decoder (62) of the machine learning system. Both encoder (61) and decoder (62) are preferably sub-machine learning systems of the machine learning system (60), even more preferably neural networks. Based on the provided sigma point (σ), the decoder (62) then determines an output signal ($y_i$) of the same shape as the input signal ($x_i$). For example, if the input signal ($x_i$) is a vector, the output signal ($y_i$) is of the same dimensionality as the input signal ($x_i$). If the input signal ($x_i$) is a matrix or a tensor, the output signal ($y_i$) is a matrix or tensor respectively of the same number of dimensions along each axis as are in the input signal ($x_i$).

In further embodiments (not shown), it is also possible that a plurality of sigma points (σ) are sample from the plurality of sigma points (σ) and that an output signal ($y_i$) is determined for each sampled sigma point (σ), thereby determining a plurality of output signals ($y_i$).

In general, the machine learning system (60) may be understood as a variational autoencoder.

Figure 2:
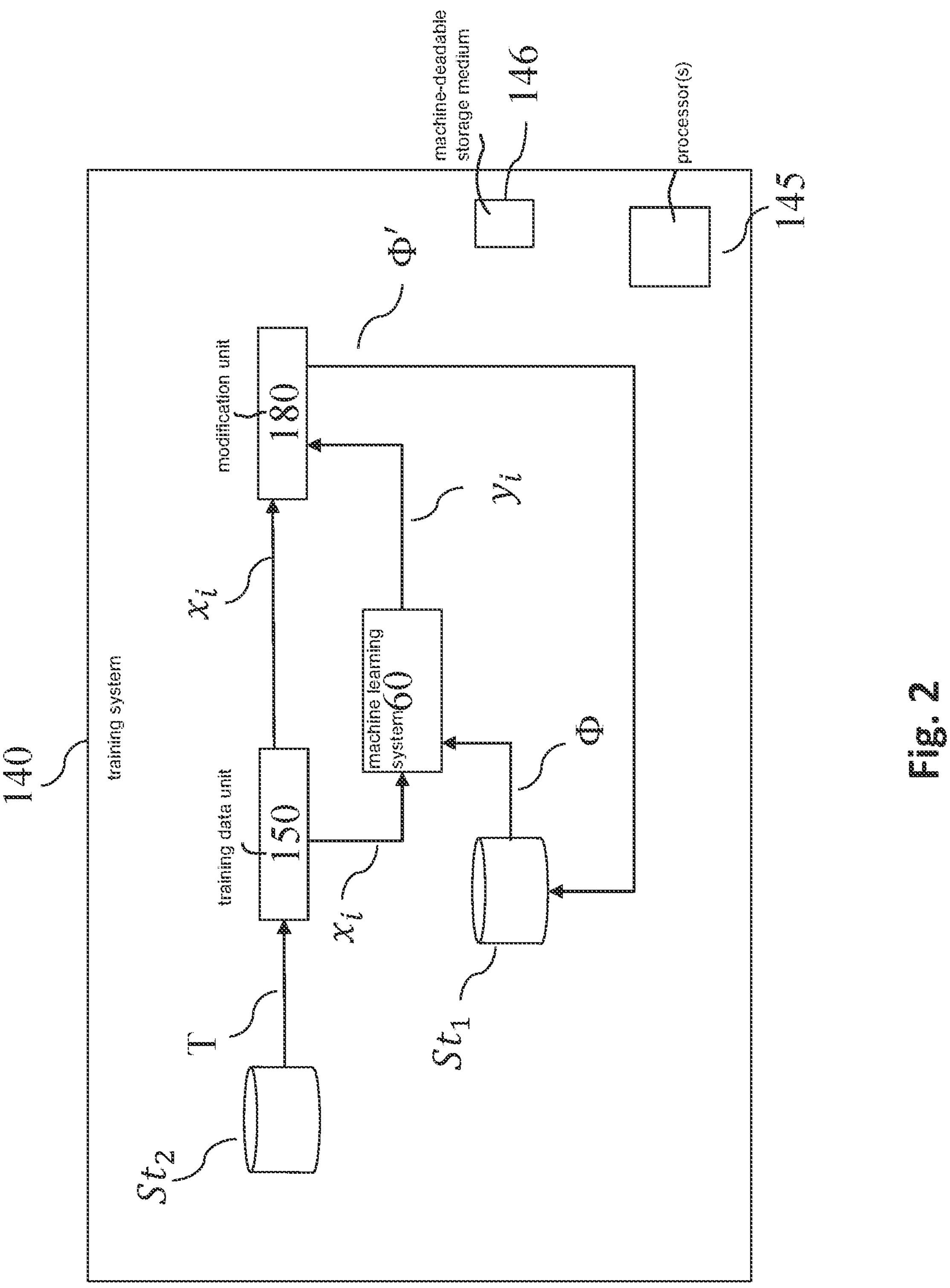
FIG. 2 shows a training system for training the machine learning system, according to an example embodiment of the present invention.

FIG. 2 shows an embodiment of a training system (140) for training the machine learning system (60 means of a training data set (T). The training data set (T) comprises a plurality of input signals ($x_i$) which are used for training the machine learning system (60).

For training, a training data unit (150) accesses a computer-implemented database ($St_2$), the database ($St_2$) providing the training data set (T). The training data unit (150) determines from the training data set (T) preferably randomly at least one input signal ($x_i$) and transmits the input signal ($x_i$) to the machine learning system (60). The machine learning system (60) determines an output signal ($y_i$) based on the input signal ($x_i$).

The input signal ($x_i$) and the determined output signal ($y_i$) are transmitted to a modification unit (180).

Based on the input signal ($x_i$) and the determined output signal ($y_i$), the modification unit (180) then determines new parameters (Φ') for the machine learning system (60). For this purpose, the modification unit (180) compares the input signal ($x_i$) and the determined output signal ($y_i$) using a loss function.

The loss function may preferably be given by the formulae:

$$\mathcal{L}_{UAE} = E_{x_i \sim p_{data}}[\mathcal{L}_{REC} + \beta \cdot \mathcal{L}_{KL}],$$

$$\mathcal{L}_{REC} = \|x_i - D(z)\|_2^2,\ z \sim \{\chi_i(\mu, \textstyle\sum)\}_{i=0}^{2n},$$

$$\mathcal{L}_{KL} = \|\mu\|_2^2 + tr(\textstyle\sum) - n - \text{logdet}\textstyle\sum,$$

wherein $x_i$ is the training input signal, $p_{data}$ is an empirical distribution, e.g., a training dataset, D(•) characterizes an output of the decoder of the machine learning system (60) for an input z, z is a randomly sampled sigma point of the plurality of sigma points $$\{\chi_i(\mu, \textstyle\sum)\}_{i=0}^{2n},$$

and β is a hyperparameter of the training method.

In other embodiments, the $\mathcal{L}_{KL}$ of the loss function may be approximated by:

$$\mathcal{L}_{KL} \approx \|\mu\|_2^2 + \|\textstyle\sum - I\|_F,$$

wherein I is an identity matrix of the same shape as Σ.

Preferably, the loss function may further comprise a regularization term penalizing an input-output gradient, weighted by the largest eigenvalue of the covariance matrix. The regularization term may be characterized by the formula:

$$\mathcal{L}_{REG} = \lambda_{max}(\textstyle\sum)\|\nabla_z D(z)\|_2^2,$$

wherein $\lambda_{max}$ is a largest eigenvalue of Σ and $\nabla_z D(z)$ is a gradient of the loss function with respect to z.

The term $\mathcal{L}_{KL}$ may preferably be multiplied by another hyperparameter γ and the product may then be to $\mathcal{L}_{UAE}$ to form a preferred loss function.

Based on the loss function, a first loss value is determined, which characterizes how far the determined output signal ($y_i$) deviates from the input signal ($x_i$).

The modification unit (180) determines the new parameters (Φ') based on the first loss value. In the given embodiment, this is done using a gradient descent method, preferably stochastic gradient descent, Adam, or AdamW. In further embodiments, training may also be based on an evolutionary algorithm or a second-order method for training neural networks.

In other embodiments, the machine learning system (60) may determine a plurality of output signal ($y_i$) based on sampling a plurality of sigma points (σ). In these embodiments, a loss value may be determined for each of the determined output signals ($y_i$) based on the loss function described above. The different loss values may then be averaged in order to determine a single loss value. Gradient descent may then be run with respect to the single loss value.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters (Φ') determined in a previous iteration are used as parameters (Φ) of the machine learning system (60). Parameters (Φ) of the machine learning system (60) may especially be parameters (Φ) of the encoder (61) or the decoder (62).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 3:
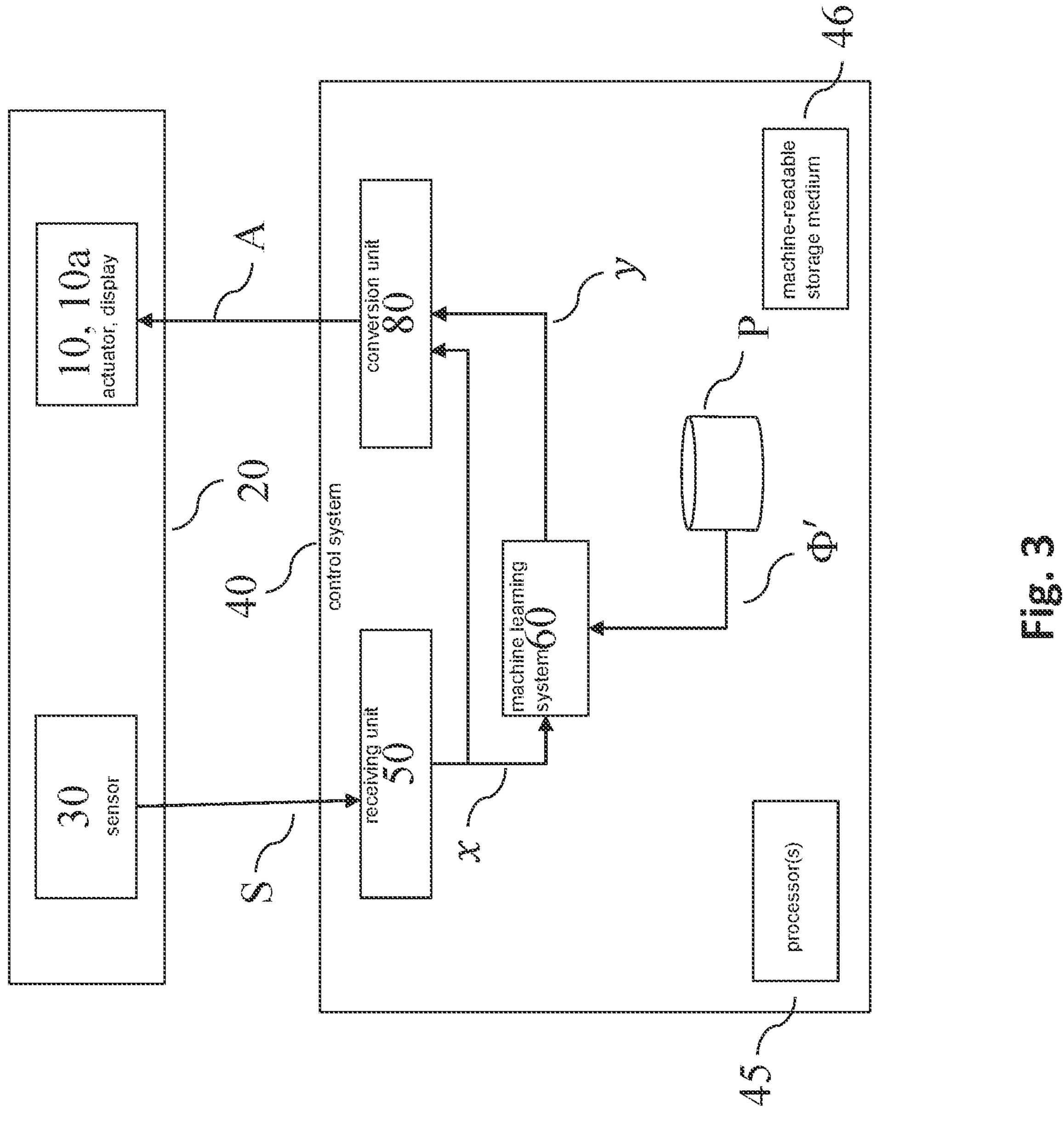
FIG. 3 shows a control system comprising a machine learning system controlling an actuator in its environment, according to an example embodiment of the present invention.

FIG. 3 shows an embodiment of a control system (40) configured for controlling an actuator (10) in its environment (20) by means of the machine learning system (60). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to the machine learning system (60).

The machine learning system (60) is parametrized by parameters (Φ), which are stored in and provided by a parameter storage ($St_1$).

The machine learning system (60) determines an output signal (y) from the input signals (x). The output signal (y) comprises information that assigns one or more labels to the input signal (x). The input signal and the output signal (y) are transmitted to a conversion unit (80), which determines the control signals (A) based on the input signal (x) and the output signals (y). The control signals (A) are then transmitted to the actuator (10) for controlling the actuator (10) accordingly.

The actuator (10) receives control signals (A), is controlled accordingly, and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10*a*) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
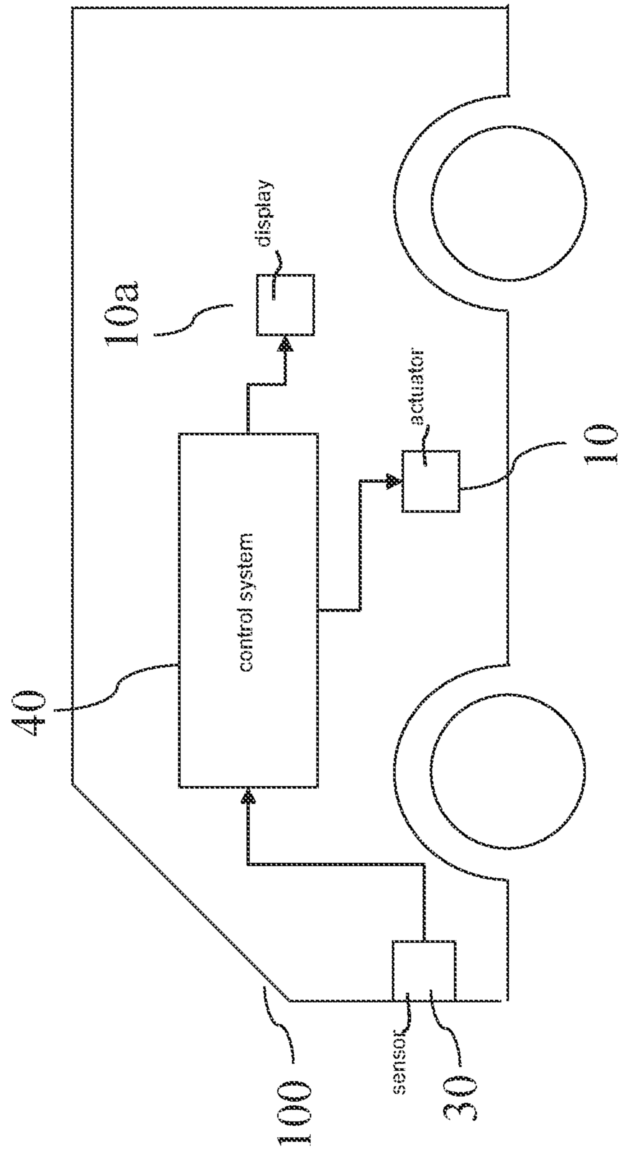
FIG. 4 shows the control system controlling an at least partially autonomous robot, according to an example embodiment of the present invention.

FIG. 4 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100). The input signal (x) may hence be understood as an input image.

The control system (40) may be configured to determine, whether the input image (x) is anomalous or not. The control signal (A) may then be determined in accordance with this information. For example, if an input signal (x) is determined as being anomalous, an automated control of the actuator (10) may be stopped and control of the actuator (10) may be handed over to an operator or driver of the robot (100).

The actuator (10), which is preferably integrated in the vehicle (100), may be given by a brake, a propulsion system, an engine, a drivetrain, or a steering of the vehicle (100).

Alternatively or additionally, the control signal (A) may also be used to control the display (10*a*), e.g., for displaying a warning in case an anomaly is detected. Th warning may also be given to an operator or driver by means of a warning sound and/or a haptic signal, e.g., a vibration of a steering wheel of the vehicle.

Figure 5:
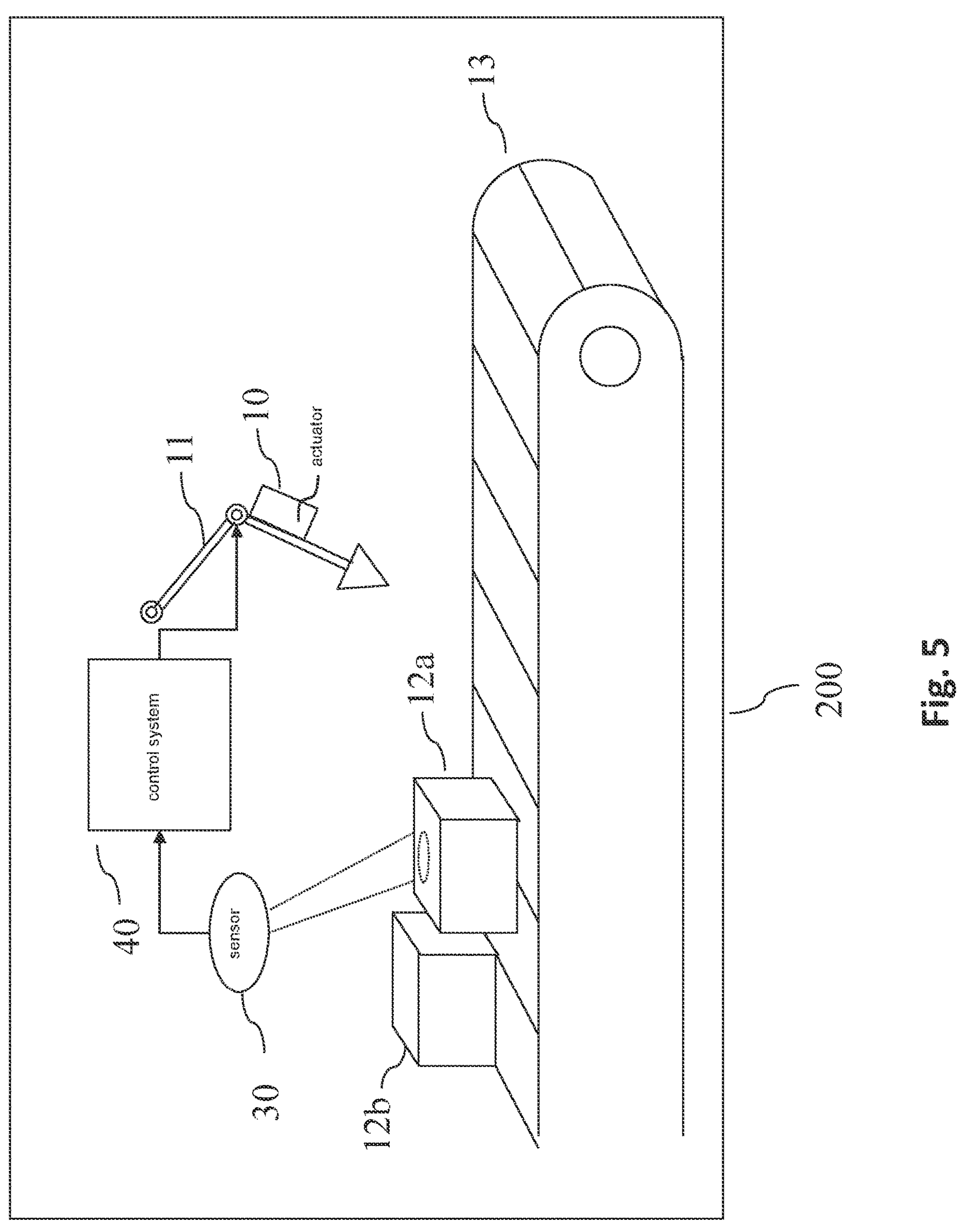
FIG. 5 shows the control system controlling a manufacturing machine, according to an example embodiment of the present invention.

FIG. 5 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12).

The control system (40) may determine whether a manufactured product (12) is anomalous or not. In case an anomaly is detected. The actuator (10) may then be controlled as to remove the manufactured product from the transportation device.

Figure 6:
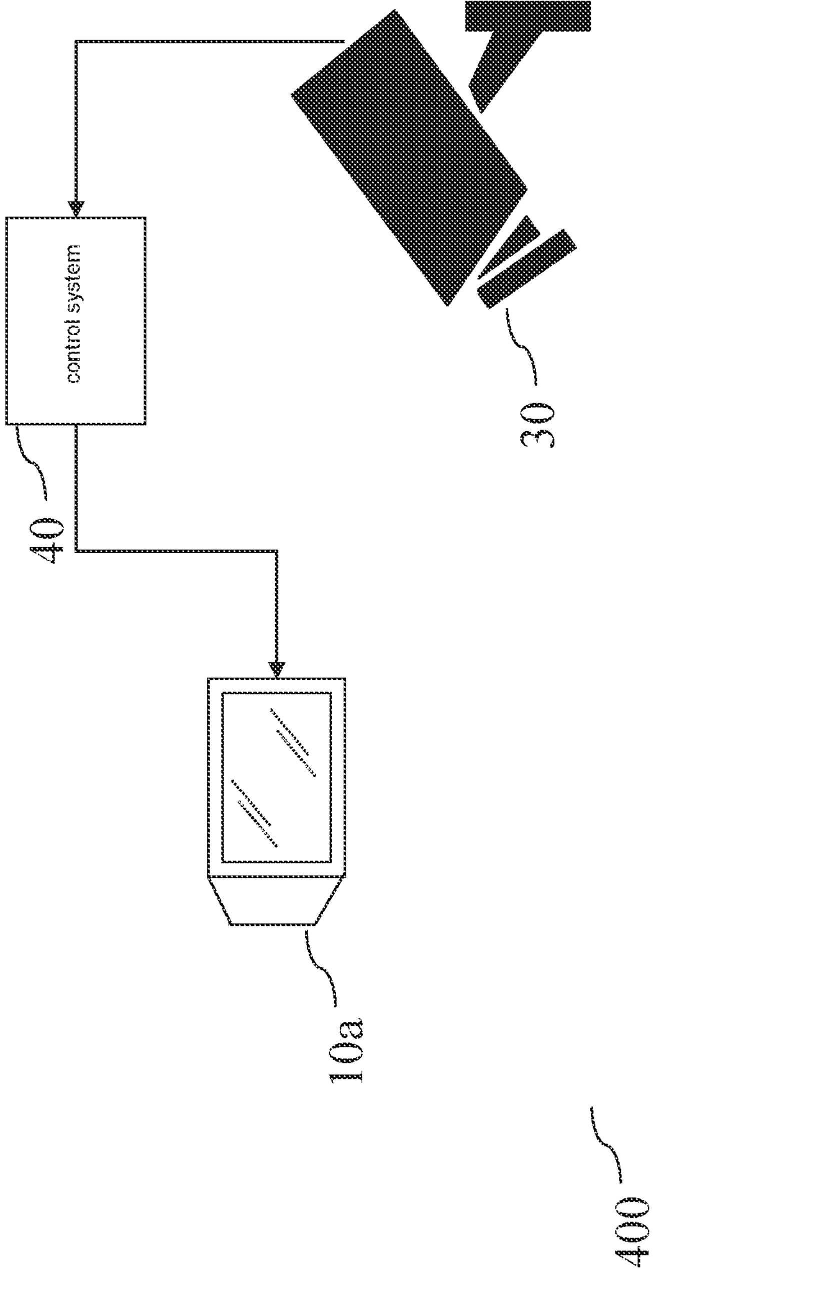
FIG. 6 shows the control system controlling a surveillance system, according to an example embodiment of the present invention.

FIG. 6 shows an embodiment in of a surveillance system (400). The sensor (30) is configured to detect a scene that is under surveillance. The control system (40) does not necessarily control an actuator (10), but may alternatively control a display (10*a*). For example, the control system (40) may determine whether the scene detected by an optical sensor (30) is normal or whether the scene exhibits an anomaly. The control signal (A), which is transmitted to the display (10*a*), may then, for example, be configured to cause the display (10*a*) to adjust the displayed content dependent on the determined classification, e.g., to highlight an object that is deemed anomalous by the control system (40).

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for training a machine learning system, wherein the machine learning system is configured for anomaly detection and/or sampling a trajectory for a traffic participant and/or sampling of sensor signals and/or for determining a value characterizing a likelihood of an input signal with respect to a training dataset, wherein the training comprises the following steps:

determining, by an encoder of the machine learning system and based on a training input signal, a first intermediate representation characterizing a mean of a latent distribution of a latent space, and a second intermediate representation characterizing a variance and/or covariance of the latent distribution;

determining, based on the first intermediate representation and the second intermediate representation, a plurality of sigma points with respect to the latent distribution;

determining an output signal, wherein the output signal is determined by providing a randomly sampled sigma point of the plurality of sigma points to a decoder of the machine learning system; and adapting the machine learning system based on a loss value, wherein the loss value characterizes a difference between the training input signal and the output signal, wherein the sigma points in the plurality of sigma points are mean-centered symmetric points, comprising the mean characterized by the first intermediate representation;

wherein the plurality of sigma points is determined according to the formulae:

$$\chi_0=\mu,$$

$$\chi_i=\mu+\sqrt{(\kappa+n)\Sigma},$$

$$\chi_{i+n}=\mu-\sqrt{(\kappa+n)\Sigma},$$

wherein $\kappa>-n$ is a predefined real constant, n is a dimensionality of the latent space, $\mu$ is the mean, and $\Sigma$ is the variance and/or covariance; and wherein the loss value is determined based on a loss function, wherein the loss function is characterized by the formulae:

$$\mathcal{L}_{UAE}=E_{x_i\sim p_{data}}[\mathcal{L}_{REC}+\beta\cdot\mathcal{L}_{KL}],$$

$$\mathcal{L}_{REC}=\|x_i-D(z)\|_2^2,\ z\sim\{\chi_i(\mu,\textstyle\sum)\}_{i=0}^{2n},$$

$$\mathcal{L}_{KL}=\|\mu\|_2^2+tr(\textstyle\sum)-n-\text{logdet}\textstyle\sum,$$

wherein $x_i$ is the training input signal, $p_{data}$ is an empirical distribution including a training dataset, D is the decoder of the machine learning system, and z is a randomly sampled sigma point of the plurality of sigma points $$\{\chi_i(\mu, \sum)\}_{i=0}^{2n}.$$

2. The method according to claim 1, wherein the loss function further includes a regularization term characterized by the formula:

$$\mathcal{L}_{REG} = \lambda_{max}(\sum)\|\nabla_Z D(z)\|_2^2,$$

wherein $\lambda_{max}$ is a largest eigen value of Σ and $\nabla_z D(z)$ is a gradient of the loss function with respect to z.

3. The method according to claim 1, wherein the sigma points in the plurality of sigma points are mean-centered symmetric points, including a mean characterized by the first intermediate representation.

4. The method according to claim 1, wherein the second intermediate representation characterizes a full covariant matrix of the latent distribution.

5. The method according to claim 1, wherein the training input signal is obtained based on a sensor.

6. A computer-implemented method for determining whether an input signal is anomalous or normal, the method comprising the following steps:

obtaining a machine learning system that is configured for anomaly detection and that has been trained by:

determining, by an encoder of the machine learning system and based on a training input signal, a first intermediate representation characterizing a mean of a latent distribution of a latent space, and a second intermediate representation characterizing a variance and/or covariance of the latent distribution, determining, based on the first intermediate representation and the second intermediate representation, a plurality of sigma points with respect to the latent distribution, determining an output signal, wherein the output signal is determined by providing a randomly sampled sigma point of the plurality of sigma points to a decoder of the machine learning system, and adapting the machine learning system based on a loss value, wherein the loss value characterizes a difference between the training input signal and the output signal;

providing the input signal to the encoder of the machine learning system to determine the first intermediate representation;

determining an output signal by providing the first intermediate representation as input to the decoder of the machine learning system;

determining the input signal as anomalous based on a difference between the output signal and the input signal exceeding a predefined threshold and otherwise determining the input signal as normal, wherein the sigma points in the plurality of sigma points are mean-centered symmetric points, comprising the mean characterized by the first intermediate representation;

wherein the plurality of sigma points is determined according to the formulae:

$\chi_0=\mu,$ $\chi_i=\mu+\sqrt{(\kappa+n)\Sigma},$ $\chi_{i+n}=\mu-\sqrt{(\kappa+n)\Sigma},$ wherein κ>−n is a predefined real constant, n is a dimensionality of the latent space, μ is the mean, and Σ is the variance and/or covariance; and wherein the loss value is determined based on a loss function, wherein the loss function is characterized by the formulae:

$$\mathcal{L}_{UAE} = E_{x_i \sim p_{data}}[\mathcal{L}_{REC} + \beta \cdot \mathcal{L}_{KL}],$$

$$\mathcal{L}_{REC} = \|x_i - D(z)\|_2^2,\ z \sim \{\chi_i(\mu, \sum)\}_{i=0}^{2n},$$

$$\mathcal{L}_{KL} = \|\mu\|_2^2 + tr(\sum) - n - \text{logdet}\sum,$$

wherein $x_i$ is the training input signal, $p_{data}$ is an empirical distribution, including a training dataset, D is the decoder of the machine learning system, and z is a randomly sampled sigma point of the plurality of sigma points $$\{\chi_i(\mu, \sum)\}_{i=0}^{2n}.$$

7. A computer-implemented method for sampling a trajectory of a traffic participant and/or a sampling sensor signal comprising the following steps:

obtaining a machine learning that has been trained and that is configured for trajectory sampling and/or sampling a sensor signal, the training including:

determining, by an encoder of the machine learning system and based on a training input signal, a first intermediate representation characterizing a mean of a latent distribution of a latent space, and a second intermediate representation characterizing a variance and/or covariance of the latent distribution, determining, based on the first intermediate representation and the second intermediate representation, a plurality of sigma points with respect to the latent distribution, determining an output signal, wherein the output signal is determined by providing a randomly sampled sigma point of the plurality of sigma points to a decoder of the machine learning system, and adapting the machine learning system based on a loss value, wherein the loss value characterizes a difference between the training input signal and the output signal;

randomly drawing a value from the latent space characterized by the machine learning system; and determining an output signal characterizing a trajectory by providing the randomly drawn value to the decoder of the machine learning system:

wherein the sigma points in the plurality of sigma points are mean-centered symmetric points, comprising the mean characterized by the first intermediate representation:

wherein the plurality of sigma points is determined according to the formulae:

$\chi_0=\mu,$ $\chi_i=\mu+\sqrt{(\kappa+n)\Sigma},$ $\chi_{i+n}=\mu-\sqrt{(\kappa+n)\Sigma},$ wherein κ>−n is a predefined real constant, n is a dimensionality of the latent space, μ is the mean, and Σ is the variance and/or covariance; and wherein the loss value is determined based on a loss function, wherein the loss function is characterized by the formulae:

$$\mathcal{L}_{UAE} = E_{x_i \sim p_{data}}[\mathcal{L}_{REC} + \beta \cdot \mathcal{L}_{KL}],$$

$$\mathcal{L}_{REC} = \|x_i - D(z)\|_2^2,\ z \sim \{\chi_i(\mu, \textstyle\sum)\}_{i=0}^{2n},$$

$$\mathcal{L}_{KL} = \|\mu\|_2^2 + tr(\textstyle\sum) - n - \text{logdet}\textstyle\sum,$$

wherein $x_i$ is the training input signal, $p_{data}$ is an empirical distribution including a training dataset, D is the decoder of the machine learning system, and z is a randomly sampled sigma point of the plurality of sigma points $$\{\chi_i(\mu, \textstyle\sum)\}_{i=0}^{2n}.$$

8. A training system comprising at least one processor configured to train a machine learning system, wherein the machine learning system is configured for executed by the least one processor for anomaly detection and/or sampling a trajectory for a traffic participant and/or sampling of sensor signals and/or for determining a value characterizing a likelihood of an input signal with respect to a training dataset, wherein the training system is configured executed by the at least one processor to:

determine, using an encoder of the machine learning system and based on a training input signal, a first intermediate representation characterizing a mean of a latent distribution of a latent space, and a second intermediate representation characterizing a variance and/or covariance of the latent distribution;

determine, based on the first intermediate representation and the second intermediate representation, a plurality of sigma points with respect to the latent distribution;

determine an output signal, wherein the output signal is determined by providing a randomly sampled sigma point of the plurality of sigma points to a decoder of the machine learning system; and adapt the machine learning system based on a loss value, wherein the loss value characterizes a difference between the training input signal and the output signal, wherein the sigma points in the plurality of sigma points are mean-centered symmetric points, comprising the mean characterized by the first intermediate representation;

wherein the plurality of sigma points is determined according to the formulae:

$$\chi_0=\mu,$$

$$\chi_i=\mu+\sqrt{(\kappa+n)\Sigma},$$

$$\chi_{i+n}=\mu-\sqrt{(\kappa+n)\Sigma},$$

wherein $\kappa>-n$ is a predefined real constant, n is a dimensionality of the latent space, $\mu$ is the mean, and $\Sigma$ is the variance and/or covariance; and wherein the loss value is determined based on a loss function, wherein the loss function is characterized by the formulae:

$$\mathcal{L}_{UAE} = E_{x_i \sim p_{data}}[\mathcal{L}_{REC} + \beta \cdot \mathcal{L}_{KL}],$$

-continued $$\mathcal{L}_{REC} = \|x_i - D(z)\|_2^2,\ z \sim \{\chi_i(\mu, \textstyle\sum)\}_{i=0}^{2n},$$

$$\mathcal{L}_{KL} = \|\mu\|_2^2 + tr(\textstyle\sum) - n - \text{logdet}\textstyle\sum,$$

wherein $x_i$ is the training input signal, $p_{data}$ is an empirical distribution including a training dataset, D is the decoder of the machine learning system, and z is a randomly sampled sigma point of the plurality of sigma points $$\{\chi_i(\mu, \textstyle\sum)\}_{i=0}^{2n}.$$

9. A control system comprising at least one processor, which the at least one processor is configured to:

obtain a machine learning system that is configured for anomaly detection and that has been trained by:

determining, by an encoder of the machine learning system and based on a training input signal, a first intermediate representation characterizing a mean of a latent distribution of a latent space, and a second intermediate representation characterizing a variance and/or covariance of the latent distribution, determining, based on the first intermediate representation and the second intermediate representation, a plurality of sigma points with respect to the latent distribution, determining an output signal, wherein the output signal is determined by providing a randomly sampled sigma point of the plurality of sigma points to a decoder of the machine learning system, and adapting the machine learning system based on a loss value, wherein the loss value characterizes a difference between the training input signal and the output signal;

provide an input signal to the encoder of the machine learning system to determine the first intermediate representation;

determine an output signal by providing the first intermediate representation as input to the decoder of the machine learning system;

determine the input signal as anomalous based on a difference between the output signal and the input signal exceeding a predefined threshold and otherwise determining the input signal as normal;

wherein the control system determines a control signal based on the output signal, wherein the control signal is configured to control an actuator and/or a display;

wherein the sigma points in the plurality of sigma points are mean-centered symmetric points, comprising the mean characterized by the first intermediate representation;

wherein the plurality of sigma points is determined according to the formulae:

$$\chi_0=\mu,$$

$$\chi_i=\mu+\sqrt{(\kappa+n)\Sigma},$$

$$\chi_{i+n}=\mu-\sqrt{(\kappa+n)\Sigma},$$

wherein $\kappa>-n$ is a predefined real constant, n is a dimensionality of the latent space, $\mu$ is the mean, and $\Sigma$ is the variance and/or covariance; and wherein the loss value is determined based on a loss function, wherein the loss function is characterized by the formulae:

$$\mathcal{L}_{UAE} = E_{x_i \sim p_{data}}[\mathcal{L}_{REC} + \beta \cdot \mathcal{L}_{KL}],$$

$$\mathcal{L}_{REC} = \|x_i - D(z)\|_2^2,\ z \sim \{\chi_i(\mu, \textstyle\sum)\}_{i=0}^{2n},$$

$$\mathcal{L}_{KL} = \|\mu\|_2^2 + tr(\textstyle\sum) - n - \text{logdet}\textstyle\sum,$$

wherein $x_i$ is the training input signal, $p_{data}$ is an empirical distribution including a training dataset, D is the decoder of the machine learning system, and z is a randomly sampled sigma point of the plurality of sigma points $$\{\chi_i(\mu, \textstyle\sum)\}_{i=0}^{2n}.$$

10. A non-transitory machine-readable storage medium on which is stored a computer program for training a machine learning system, wherein the machine learning system is configured for anomaly detection and/or sampling a trajectory for a traffic participant and/or sampling of sensor signals and/or for determining a value characterizing a likelihood of an input signal with respect to a training dataset, wherein the computer program, when executed by a processor, causing the processor to train the machine learning system by performing the following steps:

determining, by an encoder of the machine learning system and based on a training input signal, a first intermediate representation characterizing a mean of a latent distribution of a latent space, and a second intermediate representation characterizing a variance and/or covariance of the latent distribution;

determining, based on the first intermediate representation and the second intermediate representation, a plurality of sigma points with respect to the latent distribution;

determining an output signal, wherein the output signal is determined by providing a randomly sampled sigma point of the plurality of sigma points to a decoder of the machine learning system; and adapting the machine learning system based on a loss value, wherein the loss value characterizes a difference between the training input signal and the output signal, wherein the sigma points in the plurality of sigma points are mean-centered symmetric points, comprising the mean characterized by the first intermediate representation;

wherein the plurality of sigma points is determined according to the formulae:

$$\chi_0 = \mu,$$

$$\chi_i = \mu + \sqrt{(\kappa + n)\Sigma},$$

$$\chi_{i+n} = \mu - \sqrt{(\kappa + n)\Sigma},$$

wherein $\kappa > -n$ is a predefined real constant, n is a dimensionality of the latent space, $\mu$ is the mean, and $\Sigma$ is the variance and/or covariance; and wherein the loss value is determined based on a loss function, wherein the loss function is characterized by the formulae:

$$\mathcal{L}_{UAE} = E_{x_i \sim p_{data}}[\mathcal{L}_{REC} + \beta \cdot \mathcal{L}_{KL}],$$

$$\mathcal{L}_{REC} = \|x_i - D(z)\|_2^2,\ z \sim \{\chi_i(\mu, \textstyle\sum)\}_{i=0}^{2n},$$

$$\mathcal{L}_{KL} = \|\mu\|_2^2 + tr(\textstyle\sum) - n - \text{logdet}\textstyle\sum,$$

wherein $x_i$ is the training input signal, $p_{data}$ is an empirical distribution including a training dataset, D is the decoder of the machine learning system, and z is a randomly sampled sigma point of the plurality of sigma points $$\{\chi_i(\mu, \textstyle\sum)\}_{i=0}^{2n}.$$

* * * * *